Aug. 18, 1970     J. FAISANDIER     3,524,472
SLIDE VALVE

Filed Jan. 8, 1968     2 Sheets-Sheet 1

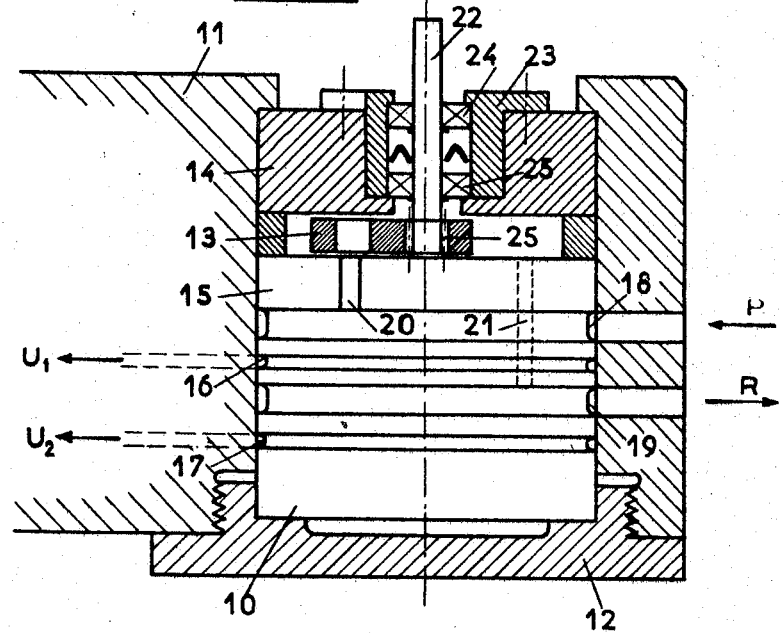
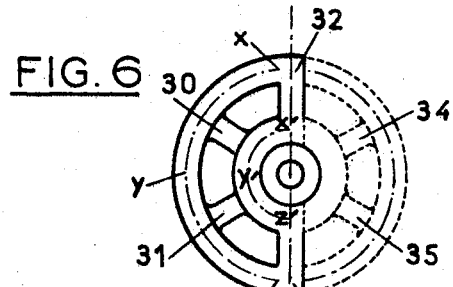
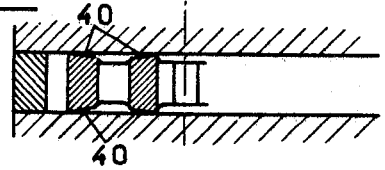
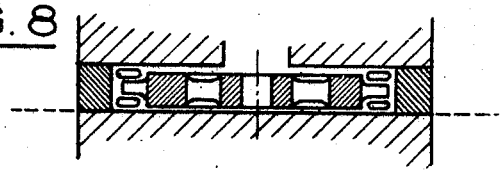

United States Patent Office 3,524,472
Patented Aug. 18, 1970

3,524,472
SLIDE VALVE
Jacques Faisandier, 32 Bd Felix Faure 92,
Chatillon-sous-Bagneux, France
Filed Jan. 8, 1968, Ser. No. 696,259
Claims priority, application France, Jan. 13, 1967,
90,991
Int. Cl. F16k 11/06
U.S. Cl. 137—625.21                                    4 Claims

ABSTRACT OF THE DISCLOSURE

A slide valve having a rotary flat slider, the axle of rotation of which is mounted in an eccentric. The preferred embodiment includes a slider having a peripheral portion connected to the axial portion by a plurality of arms.

BACKGROUND OF THE INVENTION

Field of the invention

The invention relates to slide valves and to fluid distributors including slide valves. Such valves are useful for controlling hydraulic engines, for the regulation and/or reversal of feed and in the regulation of feedback systems.

Such engines include linear jacks, rotary engines and, more generally, all hydraulic receiver units.

Description of prior art

Conventional slide or spool valves are adapted for translatory valve movement and are generally of square or circular cross-section. They are usually provided with a plurality of grooves and lands.

Where it is desired to employ these conventional distributors in precision mechanisms, it is important to have the distribution of the working fluid such as pressurised oil operating as soon as the slider is displaced by a very small quantity relative to the median position. A study of the operation of the valve shows that it is necessary for the closing edges of the slider to correspond with the edges of the corresponding orifices in the casing within a few microns for this to be achieved. This constitutes a very serious manufacturing difficulty, which almost inevitably involves readjustments, these being determined experimentally by using pressurized oil.

A second difficulty inherent in such conventional distributor is the sticking phenomena described in the specialised literature, in particular in the work of J. Faisandier: "Hydraulic Mechanisms," paragraph 3.35 21, page 112 (Dunod, 1962).

SUMMARY

The invention has for its object to eliminate these drawbacks and to ensure a precise distribution.

Another object of the invention is to provide a practical application allowing an accurate machining and facilitating the adjustment of the slider whilst mounting.

According to the present invention there is provided a slide valve comprising a valve chamber in the form of a generally cylindrical cavity of short axial dimension compared with its diameter, a plurality of ports in one or both of the flat end faces of the valve chamber, and a relatively flat disc-like rotary slider constrained for rotation about an axis to selectively open and close said ports.

BRIEF DESCRIPTION OF THE DRAWINGS

The invention is hereinafter more particularly described with reference to the accompanying drawings, in which:

FIG. 5 schematically illustrates, in axial sectional view, a preferred embodiment of the invention;

FIG. 6 is a plan view of an alternative rotary slider;

FIG. 7 is a detail of a further modification of the rotary slider in sectional view; and FIG. 8 is a sectional view of a modified mounting of the rotary slider.

DESCRIPTION OF A PREFERRED EMBODIMENT

Figure 1:
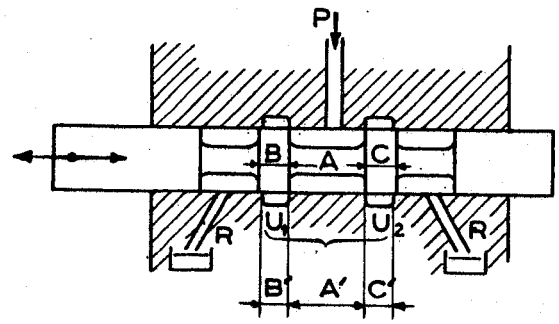
FIG. 1 illustrates a conventional spool valve with cylindrical slider capable of translatory movement in the direction of its axis, as viewed in a section including the axis.

FIG. 1 illustrates a conventional slide valve including an axially slidable cylindrical spool or slider. The main purpose of this illustration is to show the principal features which have a determining influence on the operational precision of the apparatus. Reference P designates the pressure inlet and R designates the return to a sink. The principal axial dimensions to be considered are the distance A which separates the two lands and the distances B and C which define the sealing surfaces for the apertures U1 and U2 which apertures have the dimensions B' and C' respectively. The spacing of the two apertures is defined by the distance A' which corresponds to the distance A.

Figure 2:
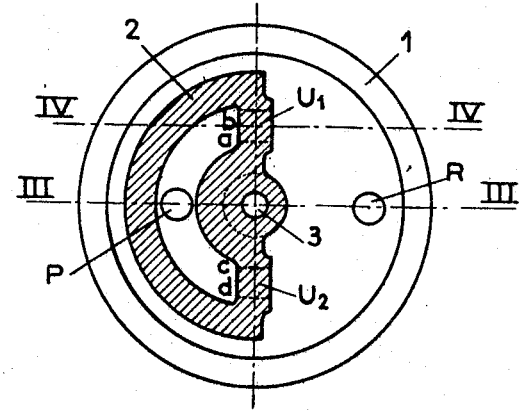
FIG. 2 is a schematic sectional view of an embodiment of slide valve constructed according to the present invention, taken along a median plane perpendicular to the axis of rotation.
Figure 3:
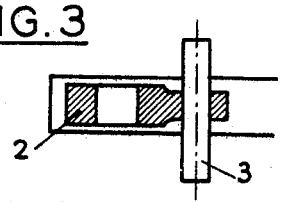
FIG. 3 is an axial half-section taken along the line III—III of FIG. 2.
Figure 4:
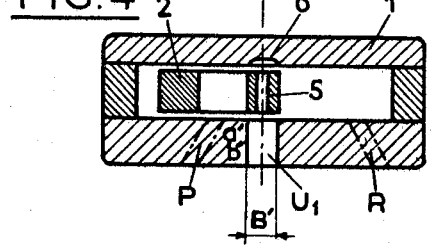
FIG. 4 is a section taken along the line IV—IV of FIG. 2.

In the embodiment of slide valve shown in FIGS. 2, 3 and 4, the valve has a casing in the form of a hollow cylinder of short axial length. Within this casing a disc-like slider 2 rotates about an axis 3. The slider is shown in a position where it blocks the operating apertures U1 and U2, while the apertures P and R are uncovered. The apertures U1 and U2 are machined into one of the planar faces of the casing, and consequently can be machined with a very high precision. Here, their shape is shown as rectangular, but it can vary in accordance with the desired characteristics of the valve. The same applies to the machining of the blocking surfaces provided on the slider 2.

The conformity of the dimensions A and A' is achieved experimentally by allowing the axis of rotation to shift slightly in order to obtain registration of the faces referenced a, b and c, d with the corresponding parts of the casing. To make possible a slight displacement of the axis of rotation, the latter may be mounted on an eccentric as in FIG. 5. To effect the adjusting operation, two manometers are mounted on the conduits U1 and U2 respectively and, while maintaining the pressures in the two conduits equal, the position of the axis is adjusted until the same desired pressure is obtained in the said conduits. The eccentric is locked after this adjustment to prevent further displacement of said axis.

FIG. 5 schematically illustrates a preferred embodiment of slide valve constructed in accordance with the invention. The valve has a generally cylindrical form 10 and is accommodated in a cylindrical cavity in a block 11 which cavity is closed by a cap 14. The slider is referenced 13 and preferably of similar shape to that shown in FIG. 2. Here, the two planar faces of the valve chamber are constituted by faces of discs 14 and 15 comprising parts of the cylinder 10, the portion of the cylinder 10 extending from the valve chamber beyond disc 15 is machined to form peripheral grooves. Grooves 16 and 17 communicate with conduits U1 and U2 respectively, leading to the unit being controlled. Groove 18 is in communication with the pressure inlet P and groove 19 with the sink R. Each of the grooves communicates by a conduit parallel to the cylindrical axis of the valve with the valve chamber comprised between the discs 14 and 15. As can be seen in the figure, a conduit 20 links the groove 18 with the valve chamber, and a conduit 21 indicated by dotted lines links groove 19 with the valve chamber.

The axle 22 of the slider is supported by the disc 14 via an eccentric 23, in which the axle is held in roller bearings 24, 25 or any other suitable bearing system. The slider is rotatably driven by the axle in channels 25, which afford a certain axial flexibility. This drive is arranged to be able to accommodate a slight wobble, thereby avoiding the necessity of providing perpendicularity of the axle relative to disc 14 to a high precision. The rotation of the slider is effected by the axle 22. As indicated in FIG. 6, the slider can be a semi-circular form, with additional reinforcing arms 30 and 31 supplementing diametral arms 32, 33 to avoid seepage along the line $x\ y\ z$ under the effect of high pressure prevailing in the interior of the chamber. These arms 30 and 31 do not extend close to the faces of the discs 14 and 15, set back so as not to hinder the normal fluid circulation.

As indicated in dotted lines in FIG. 6, the rotary slider can also be constructed in a completely circular form to improve symmetry or dynamic equilibrium, or also in a form intermediate between the two here mentioned, for example, by leaving the circle open between the arms 34 and 35.

In view of the pressure gradient prevailing in the embodiment drawn in full lines in FIG. 6, which pressure gradient acts along the great semicircle $x\ y\ z$ and the small semicircle $x'\ y'\ z'$, centering forces may be derived by constructing the upper and lower faces of the slider in very slightly conical form as shown in FIG. 7 where the frustoconical surfaces are indicated by reference 40. This construction avoids sticking phenomena and resulting irregularities.

As indicated in FIG. 8, the slider can also be centered either by balls or by rollers or by needles.

Lastly, in order to avoid axial forces due to the asymmetry of pressure from the inlets and outlets to the valve chamber, compensating apertures such as aperture 5 shown in FIG. 4 are provided, which apertures traverse the rotary slider completely, and also recesses such as 6 opposite the aperture 5.

It will be seen that I have provided a slide valve capable of operating with high precision and smooth control response. There is great ease of adjustment in the assembly of the slider in the valve chamber. It will be seen that in all cases fluid enters and leaves the valve chamber in a direction substantially parallel to the axis of the valve chamber.

What I claim is:
1. A slide valve comprising:
   a valve chamber, said chamber defining a generally cylindrical cavity having an axial dimension which is short when compared with its diameter, said cavity further being characterized by flat end surfaces;
   a plurality of ports disposed in at least one of said valve chamber end surfaces;
   a disc-like rotary slider disposed in said chamber between said end surfaces, said slider being constrained for rotation about an axis perpendicular to said end surfaces to thereby selectively open and close said ports; and
   means for transversely displacing the axis of rotation of said slider.
2. A valve according to claim 1, wherein said rotary slider is driven for rotation relatively to said chamber via an axle mounted for rotation in an eccentric, which eccentric is mounted for rotation relative to said casing to vary the position of said axis of rotation of said rotary slider.
3. A valve according to claim 1, wherein said rotary slider is provided with one or more openings therethrough for equalization of the pressure at the two opposite sides thereof.
4. A valve according to claim 1, wherein said rotary slider has a continuous peripheral active portion connected to the central portion of the slide by a plurality of arms.

References Cited

UNITED STATES PATENTS

| | | | |
|---|---|---|---|
| 620,282 | 2/1899 | Cooper | 137—625.21 |
| 707,581 | 8/1902 | Gregory | 137—625.21 XR |
| 1,036,558 | 8/1912 | Butz | 137—625.21 XR |
| 1,067,232 | 7/1913 | Adams | 137—625.21 |
| 2,351,732 | 6/1944 | Almond et al. | 137—624.21 |
| 2,938,543 | 5/1960 | Johnston | 137—625.21 XR |
| 2,946,348 | 7/1960 | North | 137—625.21 |
| 3,030,980 | 4/1962 | Swart | 137—625.17 |
| 3,207,180 | 9/1965 | Mercier | 137—625.21 |
| 3,297,052 | 1/1967 | Robinson | 137—625.21 |
| 3,316,814 | 5/1967 | Charlson | 137—625.21 XR |
| 3,391,608 | 7/1968 | Huber | 137—625.21 XR |

HENRY T. KLINKSIEK, Primary Examiner

R. J. MILLER, Assistant Examiner

U.S. Cl. X.R.

251—251